US007681022B2

(12) United States Patent
Sartorius et al.

(10) Patent No.: US 7,681,022 B2
(45) Date of Patent: Mar. 16, 2010

(54) EFFICIENT INTERRUPT RETURN ADDRESS SAVE MECHANISM

(75) Inventors: Thomas Andrew Sartorius, Raleigh, NC (US); Rodney Wayne Smith, Raleigh, NC (US); Michael Scott McIlvaine, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 11/459,695

(22) Filed: Jul. 25, 2006

(65) Prior Publication Data

US 2008/0028194 A1  Jan. 31, 2008

(51) Int. Cl.
*G06F 9/42* (2006.01)
(52) U.S. Cl. ..................................... 712/244
(58) Field of Classification Search ................. 712/244; 717/128, 127, 133; 714/17
See application file for complete search history.

(56) References Cited

U.S. PATENT DOCUMENTS

| 5,440,703 | A  | * | 8/1995  | Ray et al. ............... 712/228 |
| 5,701,493 | A  | * | 12/1997 | Jaggar ..................... 710/261 |
| 6,209,086 | B1 | * | 3/2001  | Chi et al. ................. 712/244 |
| 6,301,650 | B1 | * | 10/2001 | Satou ....................... 712/35 |
| 6,658,550 | B2 | * | 12/2003 | Martin et al. ............. 712/23 |
| 2002/0116601 | A1 | * | 8/2002 | Skrzeszewski et al. ...... 712/219 |
| 2004/0015680 | A1 | * | 1/2004 | Matsuo ..................... 712/226 |
| 2005/0060577 | A1 | * | 3/2005 | Barrett et al. ............. 713/201 |
| 2005/0273776 | A1 | * | 12/2005 | Guilford .................... 717/144 |

OTHER PUBLICATIONS

International Search Report—PCT/US07/074263, International Search Authority—European Patent Office—Nov. 30, 2007.
Written Opinion—PCT/US07/074263, International Search Authority—European Patent Office—Nov. 30, 2007.
International Preliminary Report on Patentability, PCT/US2007/074263, The International Bureau of WIPO, Geneva, Switzerland, Jan. 27, 2009.

* cited by examiner

*Primary Examiner*—Eric Coleman
(74) *Attorney, Agent, or Firm*—Nicholas J. Pauley; Peter Kamarchik; Sam Talpalatsky

(57) ABSTRACT

A system, apparatus and method for efficiently processing interrupts using general purpose registers in a pipelined processor. In accordance with the present disclosure, a register file may be updated to efficiently save an interrupt return address. When an interrupt request is received by the system's processor, or when the request is issued in the execution of a program, a pseudo-instruction is generated. This pseudo-instruction travels down the pipeline in the same way as other instructions and updates the register file by causing the register file to be written with the return address of the last instruction for which processing has not been completed.

22 Claims, 3 Drawing Sheets

| | FETCH | DECODE | ACCESS REGISTER FILE | EXECUTE | WRITE TO REGISTER FILE |
|---|---|---|---|---|---|
| CYCLE 5 | I5 | I4 | I3 | I2 | I1 |
| CYCLE 6 | I6 | I5 | I4 | I3 | I2 |
| CYCLE 7 | I7 | I6 | I5 | I4 | I3 |
| CYCLE 8 | I8 | I7 | I6 | I5 | I4 |
| INTERRUPT TO 100 | | | | | |
| CYCLE 9 | I100 | PI | X | X | X |
| CYCLE 10 | I101 | I100 | PI | X | X |
| CYCLE 11 | I102 | I101 | I100 | PI | X |
| CYCLE 12 | I103 | I102 | I101 | I100 | PI |

FIG. 2

EFFICIENT INTERRUPT RETURN ADDRESS SAVE MECHANISM

FIELD

The present disclosure relates generally to processors and, more particularly, to a pipelined processor that updates a register file to efficiently save an interrupt return address.

BACKGROUND

Achieving higher computer processing speeds has long been an object of manufacturers and users alike. In order to further the goal of high-speed processing, some computer processors employ a technique known as pipelined processing. Processors incorporating a pipelined architecture allow multiple instructions to exist in various stages of execution simultaneously.

In a pipelined architecture, a single instruction cycle may include five stages. These stages may be described sequentially as follows: (1) fetch; (2) decode; (3) access the register file; (4) execute; and (5) write to the register file. In pipelined processing, processing in each of these stages is effected in parallel to achieve high speed processing. Pipelining may be used to increase the processor speed by increasing the number of instructions completed over a period of time.

In such processors, it is possible for five instructions to co-exist in the pipeline in various stages of processing at a single time. For example, in the first several clock cycles of processing, instructions one through five may be in various stages of execution simultaneously. Completion of five-stage processing for a single instruction need not be completed before processing of a subsequent instruction may start.

For example, at one point, it is possible that instruction five is being fetched, instruction four is decoding, instruction three is accessing the register file, instruction two is executing and instruction one is being written to the register file. In pipelined processing, each instruction is generally fetched sequentially and processed sequentially in subsequent stages.

A pipelined processor must also control interrupts. Such interrupts may occur when an interrupt request signal is issued from a peripheral device or in the execution of a computer program, among other occasions. When the interrupt request occurs, the program being executed is interrupted. The processor then temporarily saves the state of the program being executed, and other processing occurs in response to the interrupt request. Once the interrupt processing is complete, the processor resumes execution of the program from the point where the program was interrupted.

Thus, a key element of the interrupted program state that must be saved is the instruction address at which program execution should resume once the interrupt processing is complete. This address is referred to as the "return address". In some architectures, it is a requirement that this return address be saved in a particular register that is part of the general purpose register file. A problem to be solved is how to provide the interrupt mechanism with access to the register file, in order to save the return address.

Some have attempted to save the return address by using dedicated ports to the register file. However, management of the processor's register file is typically a very complex and performance-critical aspect of the design, particularly in high-frequency, deeply-pipelined, superscalar processors. An additional register file port can be costly in terms of timing, area, and power, thus reducing the effectiveness of the processor. Furthermore, many high-performance designs perform out-of-order instruction processing which can demand even more complex register file management, including register-renaming, reservation stations, and completion buffers for instruction ordering. All of these complexities make it difficult to simply provide an extra port to the register file, or even to provide special control paths to share an existing register file port, for saving the interrupt return address.

BRIEF SUMMARY OF INVENTION

The present disclosure provides a system, apparatus and method for efficiently saving an interrupt return address in a general purpose register file. The present disclosure provides a mechanism for saving the program counter value or interrupt return address for an instruction that had not yet exited the pipeline when the interrupt occurred. The program instruction that was most progressed in the pipeline when the interrupt occurred, but was also incompletely processed, is sometimes referred to herein as the forwardmost instruction in the pipeline.

In accordance with one embodiment of the present disclosure, a data processing system is provided for efficiently saving the interrupt return address in the general purpose register file of a pipelined processor. The system comprises control logic configured to generate a pseudo-instruction in response to an interrupt request, wherein the pseudo-instruction is configured to cause interrupt return address for a forwardmost instruction in the pipeline to be written to a general purpose register file; and wherein the pseudo-instruction is further configured to be inserted into the pipeline and travel down the pipeline of a pipelined processor in a substantially similar manner to other instructions.

In accordance with another embodiment of the present disclosure, an apparatus is provided for efficiently saving an interrupt return address in a general purpose register file. The apparatus comprises a pipelined processor having a pseudo-instruction generator configured to generate a pseudo-instruction in response to an interrupt request, wherein the pseudo-instruction is configured to cause an interrupt return address for a forwardmost instruction in the pipeline to be written to a general purpose register file, and wherein the pseudo-instruction is further configured to be inserted into the pipeline and travel down the pipeline of a pipelined processor in a substantially similar manner to other instructions.

In accordance with yet another embodiment of the present disclosure, a method is provided for efficiently saving an interrupt return address in a general purpose register file. The method comprises in response to an interrupt request, generating a pseudo-instruction configured to cause a return address for a forwardmost instruction in the pipeline to be written to a general purpose register file in a pipelined processor, and wherein the pseudo-instruction is further configured to be inserted into the pipeline and travel down the pipeline of a pipelined processor in a substantially similar manner to other instructions.

In accordance with still another embodiment of the present disclosure, an apparatus is provided for efficiently saving an interrupt return address in a general purpose register file. The apparatus includes a multi-stage pipelined processor configured to perform interrupt processing, wherein the stages include at least one stage configured to receive instructions and at least one stage configured to write back results to a general purpose register file, the processor being further configured to process instruction data from a program.

The apparatus further includes control logic configured to generate a pseudo-instruction in response to an interrupt request, wherein the pseudo-instruction is configured to cause an interrupt return address for a forwardmost instruction in the pipeline to be written to a general purpose register file, and wherein the pseudo-instruction is further configured to be inserted into the pipeline and travel down the pipeline of a pipelined processor in a substantially similar manner to other instructions. This apparatus includes a multiplexer configured to receive both the pseudo-instruction from the control logic and the instruction data from a program, the multiplexer being further configured to select at least one of the pseudo-instruction and instruction data and input the selected pseudo-instruction or instruction data into the at least one pipeline stage configured to receive instructions. In this apparatus, after interrupt processing has occurred, the processor is further configured to resume processing of instruction data at the interrupt return address for the forwardmost instruction that was written to the general purpose register file.

It is understood that other embodiments of the present invention will become readily apparent to those skilled in the art from the following detailed description, wherein it is shown and described only various embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

These, as well as other objects, features and benefits will now become clear from a review of the following detailed description of illustrative embodiments and the accompanying drawings.

BRIEF DESCRIPTION OF DRAWINGS

FIG. 2 is a table that illustrates interrupt processing at various pipeline stages in relation to a clock cycle in accordance with one embodiment of the present disclosure.

DETAILED DESCRIPTION OF ILLUSTRATIVE EMBODIMENTS

The present disclosure provides a system, apparatus and method for efficiently saving an interrupt return address in a general purpose register file. The general purpose register file is under control of a pipeline. In accordance with the present disclosure, a general purpose register file may be updated to efficiently save a return address or program counter value for the forwardmost instruction in the pipeline at the time of the interrupt request.

When an interrupt request signal is received by the system's processor, a pseudo-instruction is generated by the processor. This pseudo-instruction is processed much like other instructions. It travels down the pipeline and updates the register file by causing the register file to be written with the return address. Because this pseudo-instruction travels down the pipeline like regular instructions, it updates not only the register file, but related resources. No dedicated hardware is required to be associated with the register file for saving the interrupt return address. The system, apparatus and method described herein may be implemented with general purpose registers and accordingly, there is no need for dedicated ports to the register file.

Figure 1:
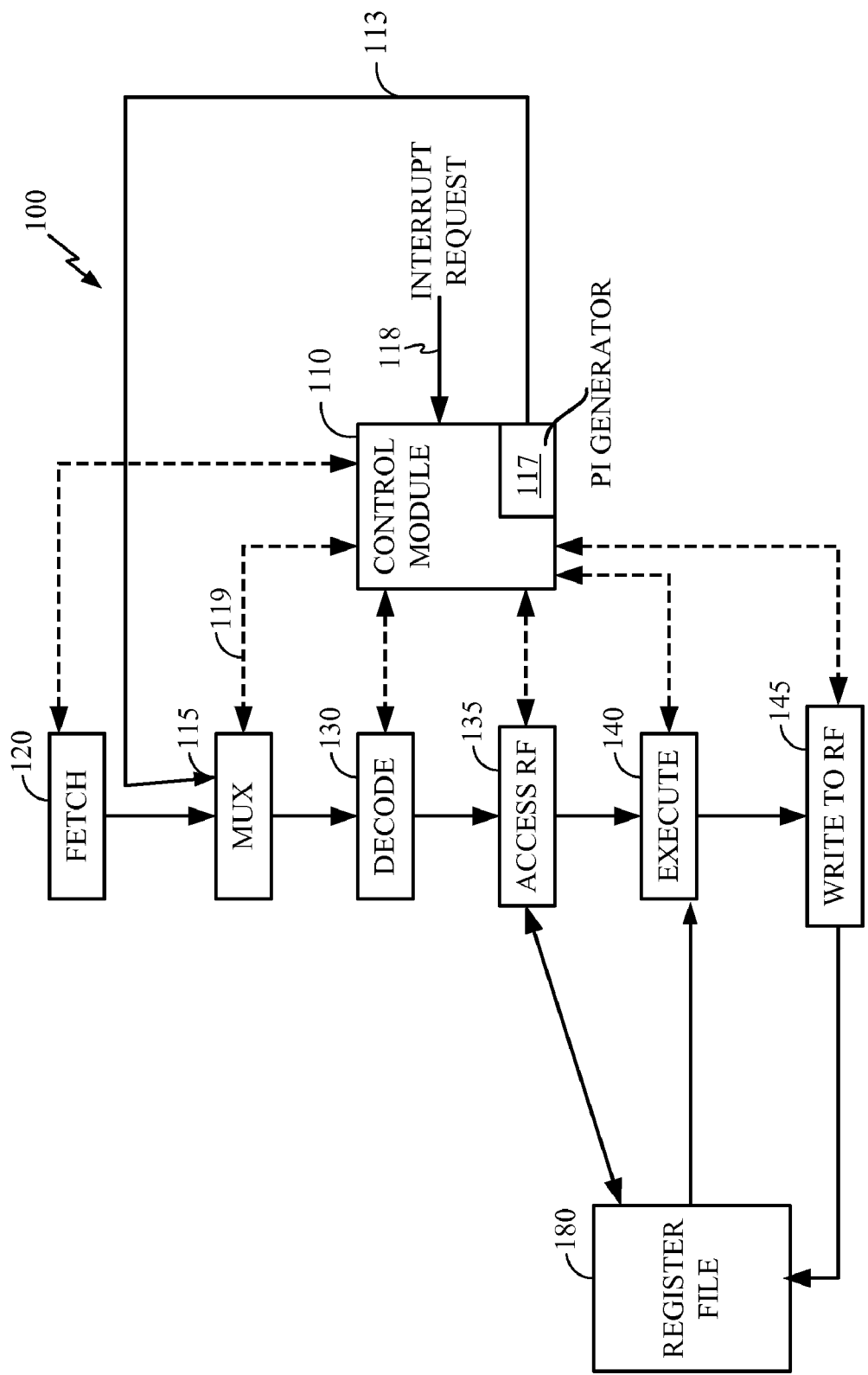
FIG. 1 is a block diagram illustration of pipelined processor control and data model in accordance with one embodiment of the present disclosure.

Referring now to FIG. 1, illustrated is a pipelined data processor model 100 in accordance with one embodiment of the present disclosure. A five-stage pipeline model is presented herein for illustration. The five stages may be described as follows: (1) fetch; (2) decode; (3) access register file; (4) execute; and (5) write to register file. Several stages of the processor model 100 may include general purpose registers. Of course, these general purpose registers can contain the memory location where data is stored as opposed to the actual data. No special registers are present or needed.

The system, apparatus and method described herein are described in terms of a five-stage pipelined processor. However, it should be understood that the system, apparatus and method described herein could be implemented in pipelined processors having fewer or more stages. Moreover, the methods and systems disclosed herein may not require partition of a processor into a particular set of pipeline stages.

For example, a disclosed stage may be further divided into two or more stages. This division may be performed in order to address timing issues or to facilitate higher processor clock speeds. Alternatively, two or more stages may be combined into a single stage. The processor may include simply a first stage that accepts instructions and a second stage that writes results to a register file. The disclosed pipeline provides only one example of how processing may be partitioned in a processor suitable for the present disclosure.

As shown in FIG. 1, the processor control module 110 controls the general pipelining operation and the flow of interrupt processing. The fetch stage 120 may be responsible for fetching instructions. Regular instructions can be fetched from various locations, including from built-in cache memory, or external memory as coordinated by a memory management unit.

Pseudo-instruction generator 117 may be control logic which may be resident in the control module 110. Pseudo-instruction generator 117 is configured to generate a pseudo-instruction that is configured to cause a return address to be written to a general purpose register file. Pseudo-instructions may be distinguished generally from regular instructions in the manner that they are input into the pipeline. Moreover, the pseudo-instruction generally performs a special function in that it is designed to cause the register file to be written with an interrupt return address. However, once the pseudo-instruction has been input into the pipeline, it travels down the pipeline just like regular instructions that have been fetched from memory or otherwise. The utility of the pseudo-instruction will be described in greater detail hereinbelow. Multiplexer 115 may be positioned between the fetch stage 120 and decode stage 130. Multiplexer 115 may determine input to decode stage 130 as either the instruction at the fetch stage 120 or a pseudo-instruction that has been generated by pseudo-instruction generator 117 in control module 110. Multiplexer 115 may select the desired input to decode stage via select line 119.

The decode stage 130 is capable of receiving and decoding an instruction fetched during fetch stage 120 or alternatively, receiving and decoding a pseudo-instruction that has been generated at pseudo-instruction generator 117 of control module 110. Assuming no interrupt processing is called for, each instruction would generally arrive at decode stage 130 from fetch stage 120 in sequential order, or for example, in the order determined by the computer program being executed.

Decoding of the data will be required to determine the address of the next instruction. The address may be for example, in the buffer as the next sequential instruction. In some instances, the address may be required to be fetched from memory or cache, for example, if the current instruction is a branch. The decode stage is the first stage of the pipeline at which instructions may be decoded to determine where the instruction ends.

Problems may be encountered when servicing interrupts. These problems may be associated with causing a register file to be written with the return address.

The present disclosure takes advantage of the fact that a register file is under the direct control of the pipeline. The processor architecture of the present disclosure uses the register file to efficiently save an interrupt return address in a general purpose register file.

Where an interrupt request signal 118 is received at control module 110, the control module 110 determines whether to perform a service interrupt via select line 119. If it is determined that a service interrupt should be performed, pseudo-instruction generator 117 generates a pseudo-instruction over path 113, inputting to multiplexer 115. It is called a "pseudo-instruction" because it doesn't actually exist in the program being executed. The pseudo-instruction is configured to cause an interrupt return address to be written to a general purpose register file. This interrupt return address has been input into pseudo-instruction generator 117 of control module 110.

Pseudo-instruction generator 117 includes control logic having, for example, various gates and transistors. This pseudo-instruction is designed to write a return address to the register file. The return address or program counter value would identify the location of the forwardmost instruction that would have completed processing next if the interrupt had not occurred. Accordingly, the return address would be for that forwardmost instruction. As would be known by those skilled in the art, the processor micro-architecture includes control logic in control module 110 for tracking instruction addresses through the pipeline. That control logic is capable of determining an instruction return address from the tracked addresses in the pipeline. The instruction return address is then supplied to the multiplexer 115 feeding the decode pipeline stage 130 as part of the pseudo instruction.

It should be understood that multiplexer 115 and/or pseudo-instruction generator 117 may be inserted into the pipeline at a stage other than as input to decode stage 130. However, it should also be understood that it may be desirable to insert the pseudo-instruction at a stage sufficiently early in the pipeline so that register file management functions can use the default or ordinary control and data paths. Register file management functions may include hazard detection, address decoding and read/write controls. In this manner, special functions may be avoided as well as dedicated ports into the register file.

After the decode stage 130, the pseudo-instruction (or other instruction where a pseudo-instruction is not currently being input) may proceed to access the register file stage 135. The processor control module 110 may access the register file for a number of reasons. For example, if an "add" instruction has been decoded at stage 130, then the register file may be accessed in order to read source operands for adding. A plurality of general purpose registers are included in the access the register file stage 135. The output of these general purpose registers may be used in later clock cycles.

After the register file has been accessed at stage 135, the instructions may be received at the instruction execution stage 140. The instructions may then be executed. A plurality of general purpose registers may be included in the instruction execution stage 140. The output of these general purpose registers may be transmitted to the write back stage 145. At write back stage 145, the processor 100 will write results back to the register file 180.

As set forth in FIG. 1, in the initial stages of a pipeline, one or more instructions are fetched from memory or cache. Generally, the instructions may flow through the pipeline in sequential order. However, interrupt handling may require the processor to return to the program that was in the process of execution when the interrupt occurred. Accordingly, it may be desirable for the processor to return to the last unprocessed instruction.

Referring now to FIG. 2, illustrated is a table that shows the various pipeline stages in which instructions may be processed in relation to a clock cycle. For purposes of illustration, it is assumed that a single stage is completed during a single clock cycle. However, it should be noted that some variations may occur.

In a pipelined architecture, execution of instructions may overlap. So even though it might take five clock cycles to execute each instruction, there can be five instructions in various stages of execution simultaneously. Accordingly, after the first instruction makes its way down the pipeline to the stage where it is written to the register file, one instruction completes substantially every clock cycle.

For purposes of the illustration in FIG. 2, it is assumed that interrupt processing is requested by a peripheral device between the eighth and ninth clock cycles. The instructions are denoted by "I" for instruction, followed by the instruction number. For purposes of illustration, it is further assumed that instruction #8 is at the fetch stage when interrupt processing is requested. Of course, it should be understood that interrupt processing may be requested at any instruction number.

In this illustration, interrupt handling has requested that the processor to go to instruction #100. In this example, instruction #100 may be where instructions related to interrupt processing may be found. Of course, interrupt processing could occur at any instruction designated by the program.

After instruction #100 has been fetched to handle interrupt processing, all incompletely processed instructions will be discarded. In this illustration, instructions #5 through #8, may be discarded because processing in sequential order (or in the order as determined by the program during ordinary operation) has been interrupted.

The forwardmost instruction for which processing is incomplete is instruction #5. At the time of the interrupt, instruction #5 is at the execute stage. This instruction, being the oldest incompletely processed instruction, has yet to exit the pipeline. Accordingly, it should be understood that the program value to which the processor should resume program execution is instruction #5. In accordance with the present disclosure, the pseudo-instruction is configured to write the return address as the forwardmost instruction. This is the oldest instruction that has not undergone complete processing, but is most progressed in the pipeline at the time of the interrupt request. This pseudo-instruction travels down the pipeline just as all the other instructions do.

In cycle twelve of the FIG. 2, the pseudo-instruction writes the address of the forwardmost instruction to the register file. When interrupt processing is complete at a later time, the processor will return to execution of the program at instruction #5, using the value that was saved in the register file.

Figure 3:
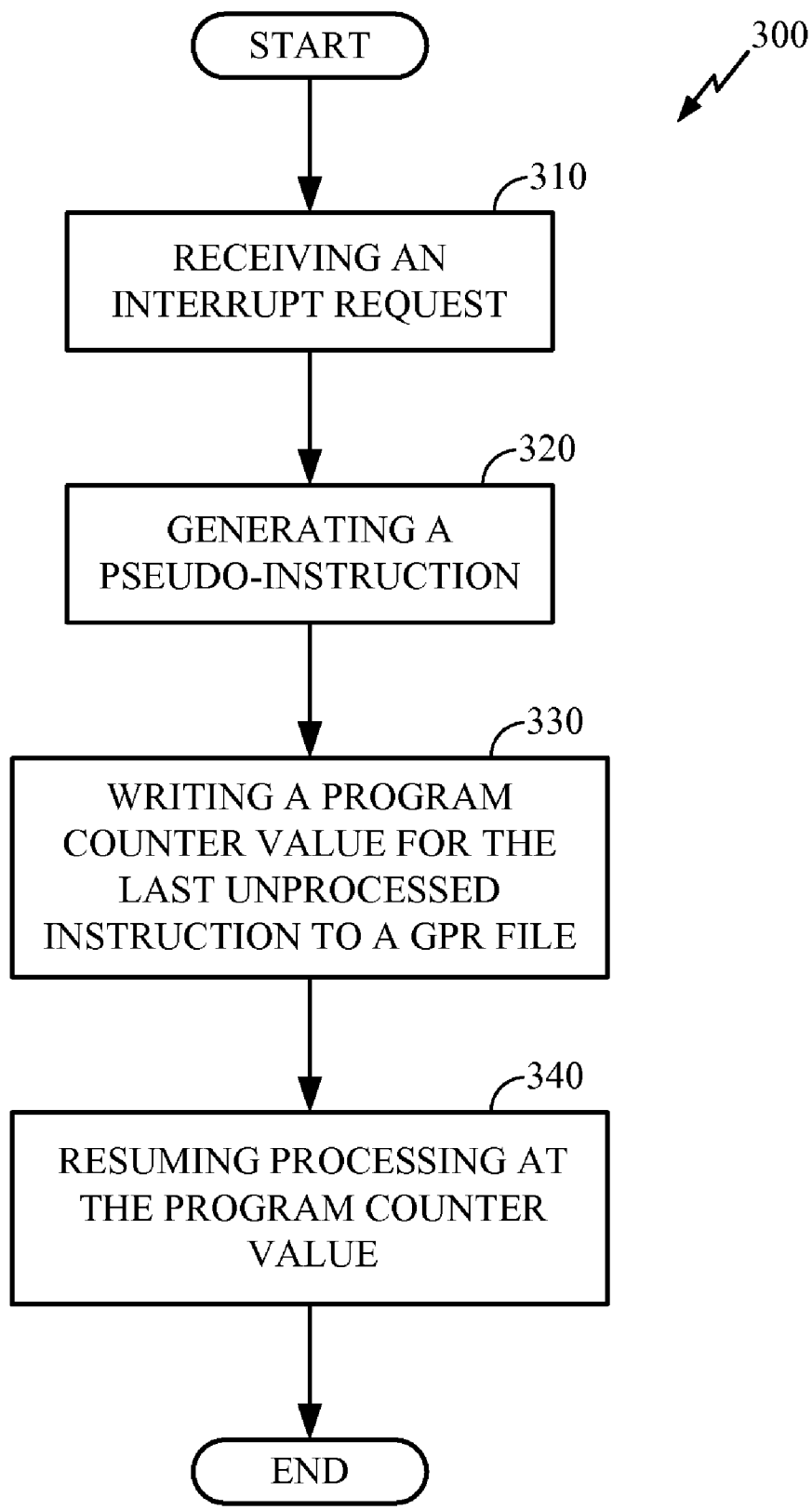
FIG. 3 is a flow chart that illustrates a method for efficiently saving an interrupt return address in a general purpose register file in accordance with one embodiment of the present disclosure.

Referring now to FIG. 3, illustrated is a method 300 for efficiently saving an interrupt return address in a general purpose register file. At step 310, an interrupt request is received. The interrupt request may be from a peripheral device, or from the program that is being executed at the time of the request or in any other way that an interrupt request is made.

At step 320, a pseudo-instruction is generated. The pseudo-instruction may be generated by control logic in the control module of a processor. The pseudo-instruction may also be generated by any other means. The pseudo-instruction is configured to efficiently save the interrupt return address in the general purpose register file. The interrupt return address is known because it has been input into the control module. The pseudo-instruction travels down the pipeline just like other instructions.

At step 330, the program value for the next unprocessed instruction is written to a general purpose register (GPR) file. The register file and related resources are updated in the normal way. Only general purpose registers are needed for this process. No dedicated ports to the register file are needed, thus saving area on the processor and avoiding complexity associated with dedicated ports or special registers.

At step 340, the processor resumes processing at the program counter value that was written to the general purpose register file. The processor may then execute instructions in the order as instructed by the program under execution.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in the terminal, or elsewhere. In the alternative, the processor and the storage medium may reside as discrete components in the terminal, or elsewhere.

The previous description of the disclosed embodiments is provided to enable a person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

We claim:

1. A data processing system comprising:
   a pipelined processor, the pipelined processor including:
   a general purpose register file; and
   control logic configured to generate a pseudo-instruction in response to an interrupt request, wherein the pseudo-instruction is configured to cause an interrupt return address to be written to the general purpose register file, the interrupt return address associated with a forwardmost instruction in a pipeline;
   wherein the pseudo-instruction is further configured to be inserted into a pipeline of the pipelined processor and travel down the pipeline in a substantially similar manner to other instructions that are inserted into the pipeline;
   wherein the pipeline comprises a plurality of stages including:
   a decode stage, wherein the decode stage is configured to decode the pseudo-instruction; and
   a write back stage, wherein the write back stage is configured to write results associated with the pseudo-instruction to the general purpose register file, the results including the interrupt return address associated with the forwardmost instruction.

2. The data processing system of claim 1, further comprising:
   a multiplexer configured to receive the pseudo-instruction and to input the pseudo-instruction into the pipeline at the decode stage.

3. The data processing system of claim 2, wherein the pipeline further comprises a fetch stage configured to fetch instructions, and wherein the multiplexer is further configured to:
   receive one or more of the fetched instructions from the fetch stage;
   receive the pseudo-instruction; and
   select the pseudo-instruction or one of the one or more fetched instructions to input to the decode stage.

4. The data processing system of claim 1, further comprising: a plurality of general purpose registers.

5. The data processing system of claim 1, wherein a pseudo-instruction generator is resident in a processor control module of the pipelined processor, and wherein the pseudo-instruction generator includes the control logic.

6. The data processing system of claim 3, further comprising:
   a memory module configured to store instruction data to be processed by the pipelined processor, wherein the memory module is coupled to the fetch stage.

7. An apparatus comprising:
   a pipelined processor including:
   a pseudo-instruction generator configured to generate a pseudo-instruction in response to an interrupt request, wherein the pseudo-instruction is configured to cause an interrupt return address associated with a forwardmost instruction in a pipeline of the pipelined processor to be written to a general purpose register file of the pipelined processor;
   wherein the pipeline comprises:
   a decode stage configured to decode the pseudo-instruction; and
   a write back stage, the write back stage configured to write results associated with the pseudo-instruction to the general purpose register file, the results including an interrupt return address associated with an incompletely processed instruction.

8. The apparatus of claim 7, further comprising:
   a multiplexer, the multiplexer configured to receive the pseudo-instruction and to input the pseudo-instruction to the decode stage.

9. The apparatus of claim 8, wherein the pipeline further comprises a fetch stage configured to fetch instructions; and wherein the multiplexer is further configured to:
receive one or more fetched instructions from the fetch stage;
receive the pseudo-instruction; and
select the pseudo-instruction or one of the one or more fetched instructions to input to the decode stage.

10. The apparatus of claim 7, wherein the pipelined processor is further configured to:
perform interrupt processing in response to the interrupt request; and
write the interrupt return address associated with the most recent incompletely processed instruction to the general purpose register file.

11. The method of claim 10, wherein the pipelined processor is further configured to resume processing at the interrupt return address that was written to the general purpose register file.

12. A method of saving an interrupt return address to a general purpose register file of a pipelined processor, the method comprising:
in response to an interrupt request, generating a pseudo-instruction configured to cause an interrupt return address associated with a forwardmost instruction in a pipeline of the pipelined processor to be written to the general purpose register file of the pipelined processor;
wherein the pipeline of the pipelined processor comprises:
a decode stage and a write back stage, wherein the decode stage is configured to decode the pseudo-instruction, and wherein the write back stage is configured to write results associated with the pseudo-instruction to the general purpose register file, the results including the interrupt return address.

13. The method of claim 12, further comprising:
performing interrupt processing in response to the interrupt request; and
writing the interrupt return address to the general purpose register file.

14. The method of claim 13, further comprising:
resuming processing at the interrupt return address that was written to the general purpose register file.

15. The method of claim 12, wherein the pseudo-instruction is generated by control logic in the processor.

16. The method of claim 12, wherein the pipelined processor further comprises a multiplexer configured to receive the pseudo-instruction and to input the pseudo-instruction into the decode stage.

17. The method of claim 16, wherein the pipeline further comprises a fetch stage configured to fetch instructions; and
wherein the multiplexer is further configured to:
receive fetched instructions from the fetch stage;
receive the pseudo-instruction; and
select the pseudo-instruction or one of the one or more fetched instructions to input to the decode stage.

18. An apparatus comprising:
a processor configured to perform interrupt processing, the processor including a pipeline, wherein the pipeline includes:
a first stage configured to receive instructions; and
a second stage configured to write back results to a general purpose register file;
wherein the processor is further configured to process instruction data from a program;
control logic configured to:
generate a pseudo-instruction in response to an interrupt request, wherein the pseudo-instruction is configured to cause an interrupt return address associated with a forwardmost instruction in the pipeline to be written to a general purpose register file;
wherein the pipeline further includes:
a decode stage and a write back stage, wherein the decode stage is configured to decode the pseudo-instruction, and wherein the write back stage is configured to write results associated with the pseudo-instruction to the general purpose register file, the results including the interrupt return address; and
a multiplexer configured to:
receive the pseudo-instruction from the control logic and the instruction data from the program; and
input the pseudo-instruction or the instruction data into the first stage;
wherein, after interrupt processing, the processor is further configured to resume processing of the instruction data at the interrupt return address.

19. The apparatus of claim 18, wherein the general purpose register file is under control of the pipeline.

20. The data processing system of claim 1, wherein the forwardmost instruction associated with the interrupt return address is incompletely processed in the pipeline.

21. The method of claim 12, wherein the forwardmost instruction associated with the interrupt return address is incompletely processed in the pipeline.

22. The apparatus of claim 18, wherein the forwardmost instruction associated with the interrupt return address is incompletely processed in the pipeline.

* * * * *

UNITED STATES PATENT AND TRADEMARK OFFICE
CERTIFICATE OF CORRECTION

PATENT NO. : 7,681,022 B2
APPLICATION NO. : 11/459695
DATED : March 16, 2010
INVENTOR(S) : Sartorius et al.

Page 1 of 1

It is certified that error appears in the above-identified patent and that said Letters Patent is hereby corrected as shown below:

Column 10, line 22, claim 18: "a general" to read as --the general--

Signed and Sealed this
Fifth Day of July, 2011

David J. Kappos
*Director of the United States Patent and Trademark Office*